Aug. 13, 1929.    R. LINN    1,724,608
HOB
Filed Nov. 26, 1927

INVENTOR.
Raymond Linn.
BY  C.R. Halbert.
    E.L. Davis.
        ATTORNEYS.

Patented Aug. 13, 1929.

1,724,608

UNITED STATES PATENT OFFICE.

RAYMOND LINN, OF DETROIT, MICHIGAN, ASSIGNOR TO THE FORD MOTOR COMPANY, OF HIGHLAND PARK, MICHIGAN, A CORPORATION OF DELAWARE.

HOB.

Application filed November 26, 1927. Serial No. 235,973.

The object of my invention is to provide a hob of simple, durable and inexpensive construction.

Still a further object of my invention is to provide a hob for cutting gear teeth which is formed with a portion of each tooth designed to be used for a finish cut and the balance formed to make the rough cut for teeth whereby the hob may be initially used for the finish cut and subsequently be used for the rough cut.

Still a further object of my invention is to provide a hob which is initially formed with the front or working portion of each tooth formed with the proper relief for making a finish cut, and the balance of the tooth formed with the proper relief for making a rough cut.

With these and other objects in view my invention consists in the arrangement, construction, and combination of the various parts of my improved device, as described in the specification, claimed in the claims, and illustrated in the accompanying drawings, in which:

Figure 1:
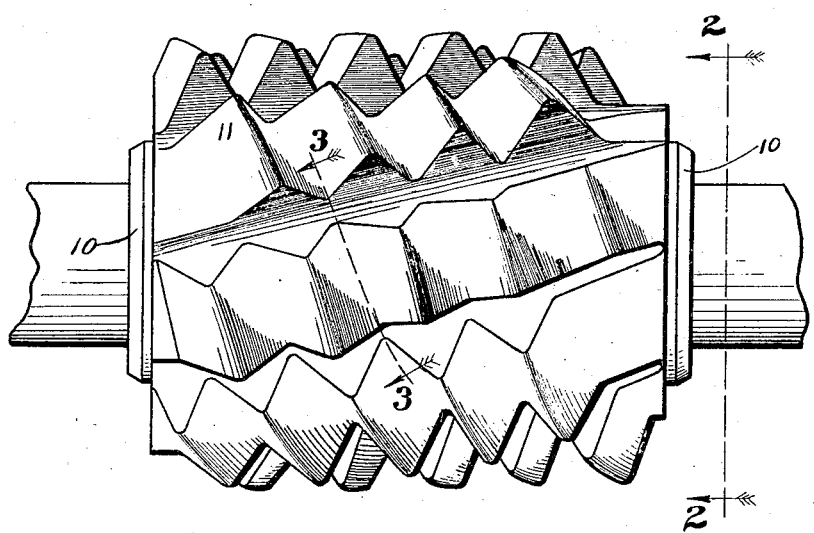
Figure 1 shows an elevation of a hob constructed in accordance with my invention.
Figure 3:
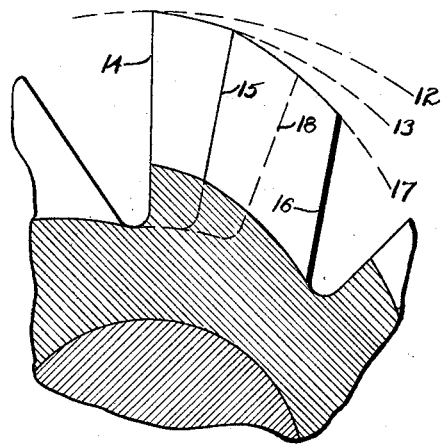
Figure 3 shows an enlarged sectional view taken on the line 3—3 of Figure 1.
Figure 2:
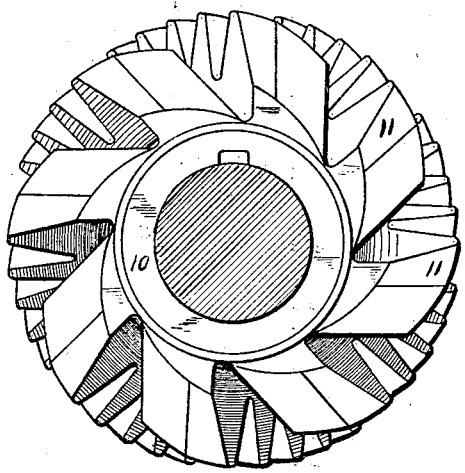
Figure 2 shows a vertical sectional view taken on the line 2—2 of Figure 1.

Referring to the accompanying drawings I have used the reference numeral 10 to indicate generally the body of a hob having a plurality of teeth 11. In the form of hob here shown the cutting edge of each tooth is provided with a relief such as is illustrated by the dotted lines 12 and 13 in Figure 3. This relief is just sufficient for a finish cut in a gear, so that this hob may be used as a finishing cutter until the teeth have been ground off from the cutting face 14 to the line 15 shown in Figure 3 by successive grindings or sharpenings. From the line 15 to the back face 16 of the tooth 11, a relief is provided such as is illustrated by the dotted lines 12 and 17, this relief being just sufficient for a roughing cut in a gear. After the teeth have been ground off by successive sharpenings as far as the line 15, namely, after using up the portion of the hob having the finishing relief thereon, then the hob can be used for making rough cuts in gears and it can be used until it has been ground down by further successive sharpenings to approximately the dotted line 18 in Figure 3.

It will be understood that hobs have been made for years and that the practice has been to make the teeth in connection with these hobs so that there is a relief thereon which is proper for either a finished cut or a rough cut. The hobs would then be used until they had been ground down by successive sharpenings so that there would be danger of the teeth breaking off namely to a size indicated by the distance between the line 15 and dotted line 18. The effective length of the teeth has always been limited because there must be the relief indicated by the lines 12 and 13 and because the teeth can only have a relatively small variation from the pitch diameter. The relief is always made as small as possible to thereby lengthen the teeth as much as possible. Finish hobs have therefore reached a standard in which the total tooth length is indicated by the distance from the face 14 to the dotted line 18, and the relief by the dotted lines 12 and 13. With roughing hobs approximately twice as much relief is required but more variation from the pitch diameter is permissible. The relief has been standardized to that indicated by the dotted lines 12 and 17. The effective length of the teeth of a roughing hob is not limited so much by pitch diameter limits, but they have also been standardized to a tooth length indicated by the distance from the line 15 to the back face 16.

If the teeth were only originally made of a length equal to the distance between the lines 14 and 18, or 15 and 16, it will be seen that the useful life of the hob would be the cuts which could be made with the portion of the tooth between the lines 14 and 15, or 15 and 18. These distances cannot be substantially increased because it is necessary to have the relief indicated by the lines 12, 13 and 17. If the teeth were made to extend from 14 to 18 or from 15 to 16, it would be possible to get approximately one more tooth in on a hob which would increase the life of the hob for a finish or rough cut approximately ten to fifteen percent whereas by making the combination teeth which I have here disclosed I am enabled to almost double the ordinary useful life of a hob. The material for this improved hob as compared with those which have only the finish or the rough cut teeth is substantially the same and the labor of forming same is substantially the same. In this connection it should be mentioned that the cam which is used on the hob finishing machine may be made with a proper shape so that the hob finishing tool will give the teeth the double relief described in this specification so that the operations in forming this hob are practically the same as for forming any other hob. In other words this hob enables me to substantially double the life of an ordinary hob without materially increasing the expense of forming same.

A further advantage results from the use of my improved hob in that I am enabled to proportion the finish and rough cut portions thereof so that the roughing portion of each hob will cut the same number of gears that the finishing portion does, thereby reducing the total number of hobs required for any one job to a minimum.

Some changes may be made in the construction, arrangement, and combination of the various parts of my improved device without departing from the spirit of my invention, and it is my intention to cover by my claims such changes as may reasonably be included within the scope thereof.

I claim as my invention:

1. In a device of the character described, a hob having a plurality of teeth thereon, each tooth having a portion thereof formed with a relief proper for making a finish cut and a portion formed with a relief proper for making a rough cut.

2. In a hob, a plurality of teeth each having a section adjacent to their cutting edge when initially formed with the relief proper for a finish cut, and a section in rear thereof with a relief proper for a rough cut.

3. A hob having teeth each formed with the front portion formed with a proper relief for a finish cut and a middle portion formed with a relief proper for a rough cut.

November 2, 1927.

RAYMOND LINN.